E. A. LAUGHLIN.
VARIABLE LOAD BRAKE SYSTEM.
APPLICATION FILED APR. 9, 1918.

1,437,852.

Patented Dec. 5, 1922.
3 SHEETS—SHEET 1.

Witnesses:
C. E. Wessels.
B. G. Richards

Inventor:
Elmyr A. Laughlin,
By Joshua R. H. Potts
his Attorney.

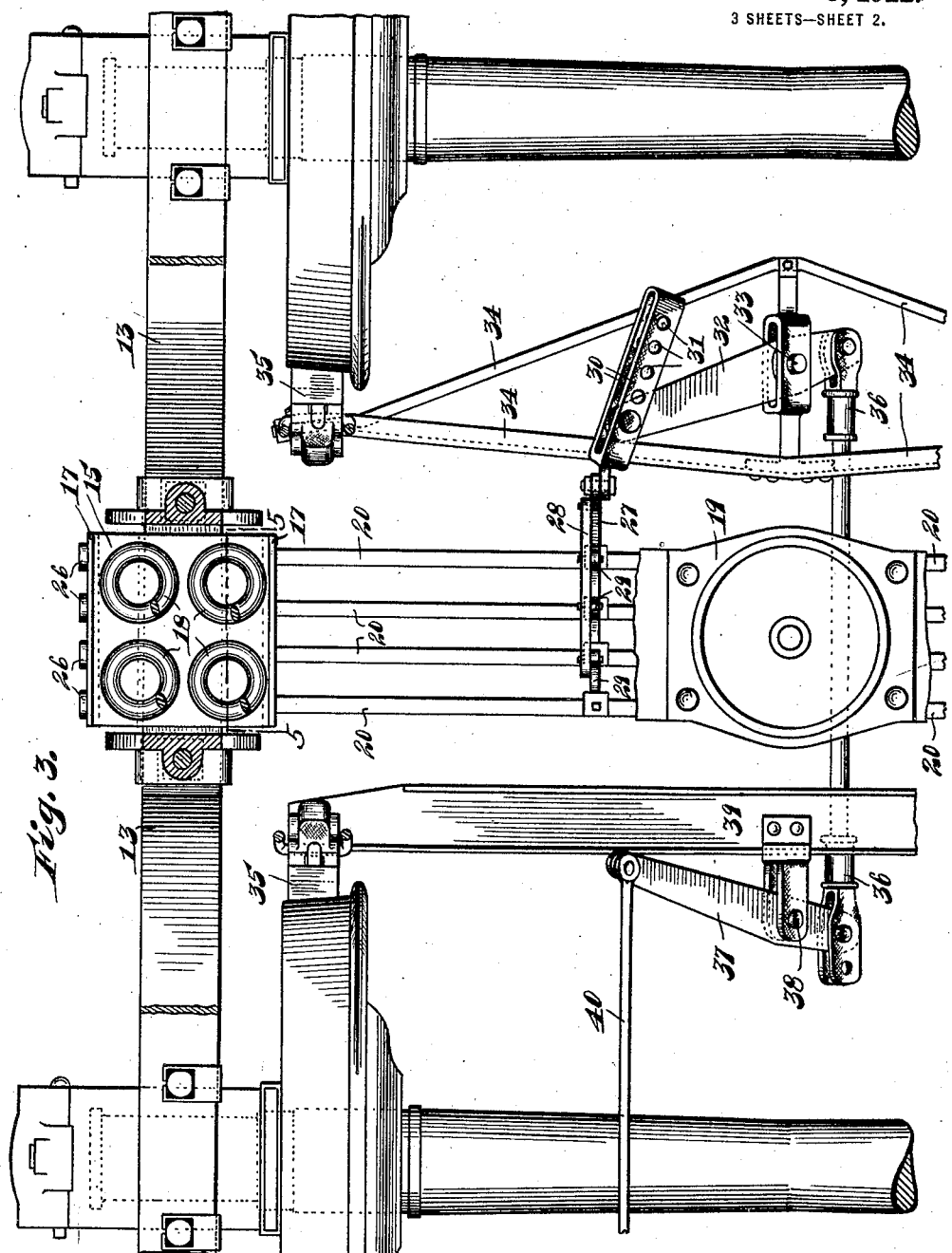

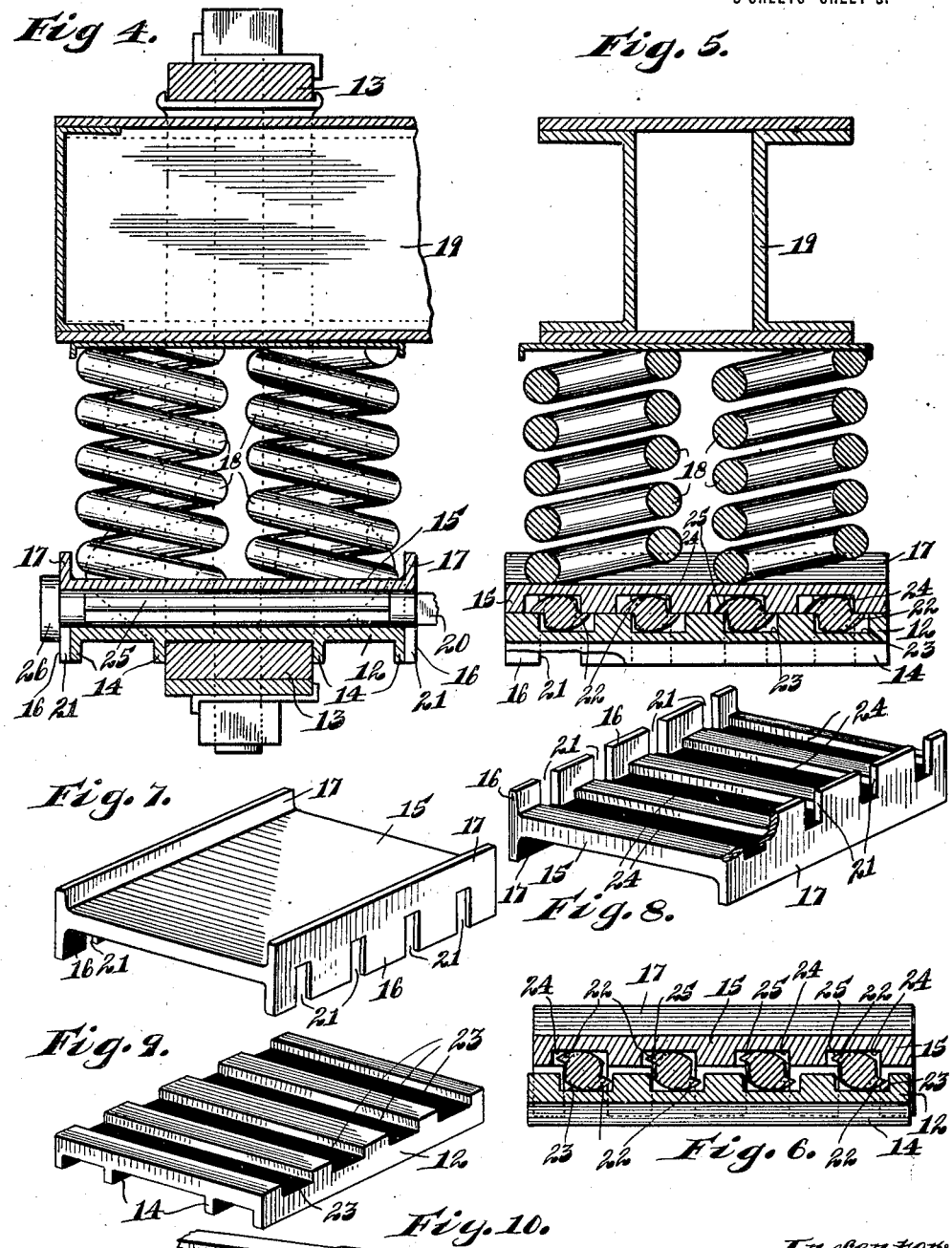

Patented Dec. 5, 1922.

1,437,852

UNITED STATES PATENT OFFICE.

ELMYR A. LAUGHLIN, OF OREGON, ILLINOIS.

VARIABLE-LOAD BRAKE SYSTEM.

Application filed April 9, 1918. Serial No. 227,460.

*To all whom it may concern:*

Be it known that I, ELMYR A. LAUGHLIN, a citizen of the United States, and a resident of the city of Oregon, county of Ogle, and State of Illinois, have invented certain new and useful Improvements in Variable-Load Brake Systems, of which the following is a specification.

My invention relates to improvements in variable brake load systems especially adapted for use on railway cars, and has for its object the provision of an improved construction of this character arranged to apply a variable braking force to the car wheels which is directly proportionate to the load carried by the car. It is of simple construction and efficient in operation, and may be readily substituted for or in standard braking systems now in use.

Other objects will appear hereinafter.

The invention consists in the combinations and arrangements of parts hereinafter described and claimed.

Figure 1:
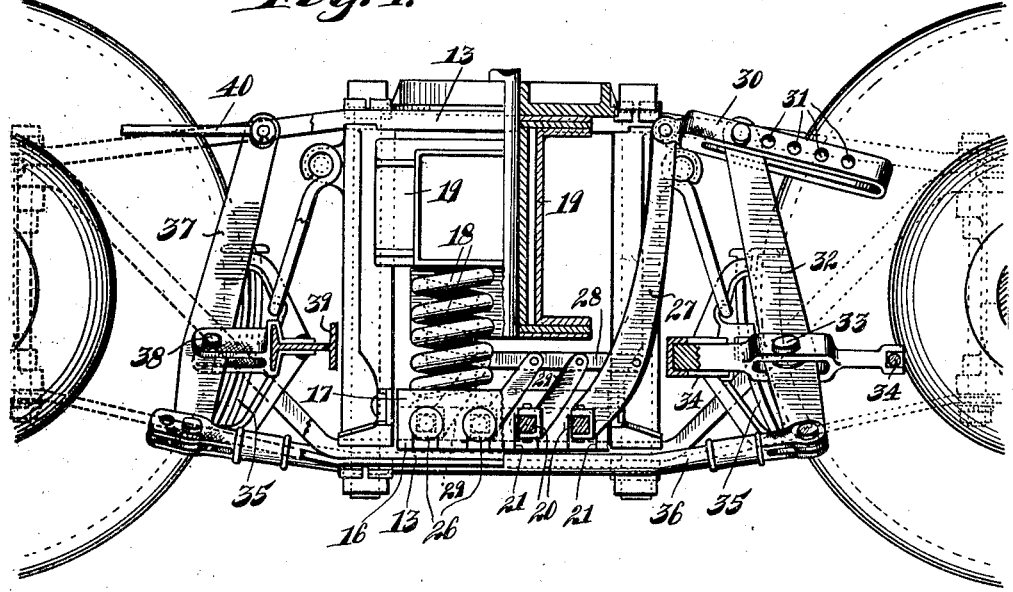
Figure 2:
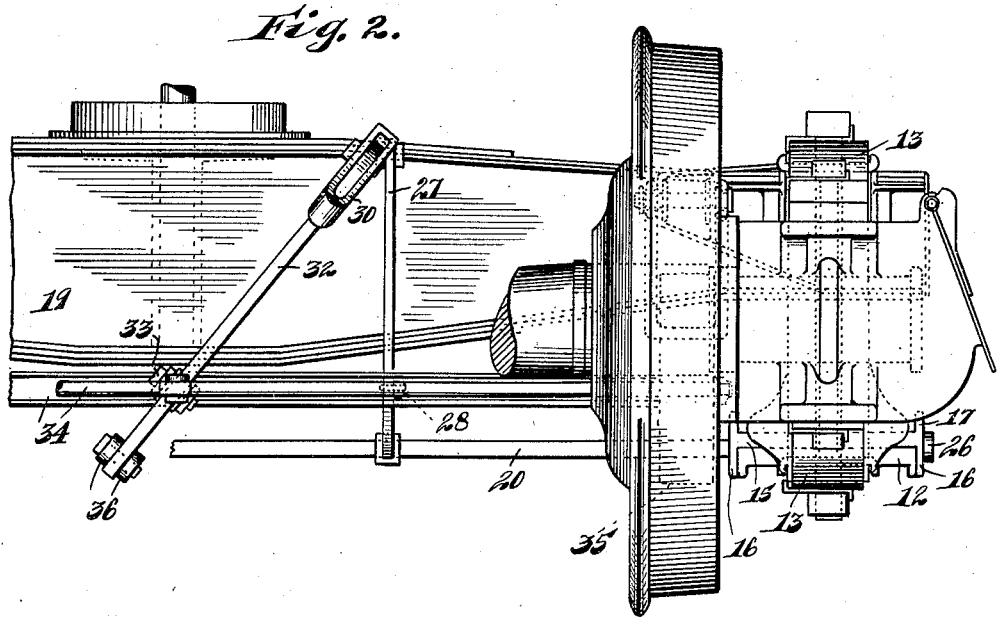

The invention will be best understood by reference to the accompanying drawings forming a part of this specification, and in which, Fig. 1, is a partial side view shown partially in section, of a car truck equipped with a braking system embodying the invention, Fig. 2, a partial transverse section of the same, Fig. 3, a partial top plan view of the same, Fig. 4, a partial transverse section taken through one of the side frames of the truck, Fig. 5, a partial section taken at right angles to Fig. 4, and substantially on line 5—5 of Fig. 3, Fig. 6, a detail section corresponding with the lower portion of Fig. 5 and showing the position the parts assume in use, Fig. 7, a perspective view of the upper of two bearing plates employed in the system, Fig. 8, a perspective view of the plate shown in Fig. 7, reversed, Fig. 9, a perspective view of the lower bearing plate co-operating with the plate shown in Fig. 7, and Fig. 10, a perspective view of one end of a plurality of rocker shafts employed in the system.

The preferred form of construction, as illustrated in the drawings, comprises lower bearing plates 12 arranged to be loosely inserted in the usual side frames 13 of the truck, and provided with depending flanges 14 adapted to loosely fit against the inner and outer sides of the side frames. Upper bearing plates 15 are arranged to co-operate with the plates 13 and are provided with depending flanges 16 arranged to fit over the inner and outer edges of the plates 12 so as to prevent lateral displacement but to permit of longitudinal movement. The plates 15 are equipped with upwardly extending flanges 17 at their inner and outer edges, adapted to form seats for corresponding car springs 18 arranged in the usual manner to support the opposite ends of the usual truck bolster 19 extending between the side frames 13. A plurality of square rocker shafts 20 are extended transversely between the side frames of the truck, with their ends passing between the plates 12 and 15, the flanges 16 of the plates 15 being provided with notches 21 to accommodate said shafts. The ends of the shafts 20 are offset or otherwise formed to form rocker arms 22 resting in recesses 23 and 24 provided respectively in plates 12 and 15, the bearing surfaces 25 of said rocker arms being given contours, as indicated, adapted to exert constant lifting leverage on plates 15 as said rocker shafts are rocked. The recesses in plates 12 and 15 permit of flat and extended bearings between said plates under normal conditions of use, thus relieving the ends of shafts 20 from strain, except when actually in use. The shafts 20 are provided on opposite ends with heads or flanges 26 larger than the notches 16 and fitting against the outer sides of plates 15, thus preventing longitudinal displacement of said shafts. By this arrangement it will be observed that upon simultaneous rocking of the shafts 20, the uppermost plates 15 will be simultaneously elevated, thus elevating the corresponding springs and bolsters against the resistance of the weight of the car resting on the bolsters, so that the only resistance offered to the rocking of the shafts 20 is the weight of and the load on the car.

A lifting lever 27 is rigidly secured at its lower end to one of the shafts 20 intermediate its ends, and a link 28 is connected with said lifting lever and with the upper free ends of rocker arms 29 secured to the other shafts 20, whereby all of said shafts are compelled to rock or oscillate simultaneously and in unison with each other. At its upper end lever 27 carries a fulcrum yoke or link 30, having a plurality of bolt holes 31 therein and by means of which said yoke may be adjustably attached to the upper end of one of the ordinary brake levers 32 of the truck. The brake lever 32 is pivoted at 33 to a trussed brake beam 34 carrying brake shoes 35 bearing against one set of wheels of the truck in the usual manner. The lower end of brake lever 32 is connected by the usual link 36 with the lower end of the usual co-operating oppositely disposed brake lever 37. The brake lever 37 is pivoted at 38 to a brake beam 39 shown in this instance as a solid I beam and carrying the usual brake shoes 35 co-operating with the other wheels of the truck. The usual connecting rod 40 is connected with the upper end of brake beam 37 for applying force to the brake beams in the usual manner for applying the brake shoes 35 to the wheels. By this arrangement, it will be observed that the ultimate fulcrum for the brake levers 37 and 32 is located at the upper end of the lifting lever 27, so that the reaction of all force applied to said brake levers and consequently to the brake shoes is exerted on said lifting lever to effect lifting of the car riding upon the truck. Inasmuch as it is a fundamental law of mechanics that action and reaction must be always equal and opposite, it follows that no more force can be applied to the brake shoes than the reaction afforded by the load of and on the car will permit, the ultimate fulcrum for the levers constantly and freely yielding to limit the application of the force. This action is due to the fact that the fulcrums of the brake applying levers are connected with the car, whereby yielding of the lever fulcrums is constantly resisted by the weight of the car. Thus, no matter what force is applied to the braking levers, the braking force applied to the wheels must bear a certain definite relation to the load carried by the car. By changing the relative leverages the relation of the braking force to the load of and on the car may be varied as desired, but such braking force will always be proportionate to said load. This being so, if the leverages are properly designed, a requisite braking force can be applied to the wheels of the car to check the same but not sufficient braking force applied to prevent rotation of the wheels and consequent flattening thereof as they slide upon the rails.

Another effect of this arrangement is that it prevents automatic locking of the forward wheels against the forward brake shoes. As will be observed, the forward brake shoes are applied to the rear peripheries of the wheels below the horizontal diametric plane thereof so that the reactions from said wheels impart an upward tendency to the brake shoes. Such upward movement of the brake shoes tends to automatically increase the braking force or pressure due to the wedging action of the wheels. Such wedging action can only be relieved by yielding of the braking force, and I have found, by actual tests, that it requires many times the braking force applied to the brakes to relieve them from this wedging action, due probably to the friction of the parts. By the arrangement set forth, the yielding character of the fulcrums of the levers tends to relieve this wedging action, thus tending to prevent locking and sliding of the forward wheels.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

Having described my invention, what I claim as new and desire to secure by Letters Patent is:—

1. A car brake system comprising a brake shoe; a brake lever arranged to apply said shoe to a wheel of the car; means for applying force to said lever to apply said shoe; a freely yielding mounting for the fulcrum of said lever; and an operative connection between said mounting and the car whereby yielding of the lever fulcrum is constantly and substantially uniformly resisted by the weight of the car, substantially as described.

2. The combination with the springs of a car truck, of vertically yieldable bearing plates positioned under said springs; a lifting lever operatively connected with said plates; a brake lever constantly fulcrumed on said lifting lever; a brake shoe carried by said brake lever and arranged to be applied to a wheel of the car; and means for applying force to said brake lever to apply said brake shoe, substantially as described.

3. The combination with the springs of a car truck, of vertically yieldable bearing plates positioned under said springs; rockers under said plates arranged to lift the same; a lifting lever operatively connected with said rockers; a brake lever constantly fulcrumed on said lifting lever; a brake shoe carried by said brake lever and arranged to be applied to a wheel of the car; and means for applying force to said brake lever to apply said brake shoe, substantially as described.

4. The combination with the springs of a car truck, of vertically yieldable bearing plates positioned under said springs; rockers extending across said truck under said plates arranged to lift the same; a lifting lever operatively connected with said rockers; a brake lever constantly fulcrumed on said lifting lever; a brake shoe carried by said brake lever and arranged to be applied to a wheel of the car; and means for applying force to said brake lever to apply said brake shoe, substantially as described.

5. The combination with the springs of a car truck, of vertically yieldable bearing plates positioned under said springs; a lifting lever operatively connected with said plates; a brake lever constantly fulcrumed on said lifting lever; a brake shoe carried by said brake lever and arranged to be applied to a wheel of the car; a second brake lever oppositely positioned with reference to said first mentioned brake lever; a brake shoe on said second brake lever; an operative connection between said brake levers; and means for applying force to said second brake lever to apply the brake thereon, substantially as described.

6. The combination with the springs of a car truck, of vertically yieldable bearing plates positioned under said springs; rockers under said plates arranged to lift the same; a lifting lever operatively connected with said rockers; a brake lever constantly fulcrumed on said lifting lever; a brake shoe carried by said brake lever and arranged to be applied to a wheel of the car; a second brake lever oppositely positioned with reference to said first mentioned brake lever; a brake shoe on said second brake lever; an operative connection between said brake levers; and means for applying force to said second brake lever to apply the brake thereon, substantially as described.

7. The combination with the springs of a car truck, of vertically yieldable bearing plates positioned under said springs; rockers extending across said truck under said plates arranged to lift the same; a lifting lever operatively connected with said rockers; a brake lever constantly fulcrumed on said lifting lever; a brake shoe carried by said brake lever and arranged to be applied to a wheel of the car; a second brake lever oppositely positioned with reference to said first mentioned brake lever; a brake shoe on said second brake lever; an operative connection between said brake levers; and means for aplying force to said second brake lever to apply the brake thereon, substantially as described.

8. The combination with the side frames of a car truck, of a truck bolster mounted in said side frames; springs in said side frames under the opposite ends of said bolster; a bearing plate removably seated in each side frame under the corresponding springs; a vertically movable bearing plate on top of each of said first mentioned bearing plates; a plurality of rocker shafts extending between said side frames and having their opposite ends located between the bearing plates in each side frame; rocker arms on each rocker shaft arranged to separate the super-posed bearing plates; an operative connection between said rocker shafts compelling simultaneous operation thereof; a lifting lever secured at its lower end to one of said rocker shafts; and a fulcrum for the brake lever of the truck mounted on the upper end of said lifting lever, substantially as described.

9. The combination with the side frames of a car truck, of a truck bolster mounted in said side frames; springs in said side frames under the opposite ends of said bolster; a bearing plate removably seated in each side frame under the corresponding springs; a vertically movable bearing plate on top of each of said first mentioned bearing plates; a plurality of rocker shafts extending between said side frames and having their opposite ends located between the bearing plates in each side frame; rocker arms on each rocker shaft arranged to separate the superposed bearing plates and shaped to exert a constant leverage thereon; an operative connection between said rocker shafts compelling simultaneous operation thereof; a lifting lever secured at its lower end to one of said rocker shafts; and a fulcrum for the brake lever of the truck mounted on the upper end of said lifting lever, substantially as described.

10. The combination with the side frames of a car truck, of a truck bolster mounted in said side frames; springs in said side frames under the opposite ends of said bolster; a bearing plate removably seated in each side frame under the corresponding springs; a vertically movable bearing plate on top of each of said first mentioned bearing plates; a plurality of rocker shafts extending between said side frames and having their opposite ends located between the bearing plates in each side frame; rocker arms on each rocker shaft arranged to separate the superposed bearing plates; an operative connection between said rocker shafts compelling simultaneous operation thereof; a lifting lever secured at its lower end to one of said rocker shafts; a brake lever constantly fulcrumed on the upper end of said lifting lever; a brake shoe carried by said brake lever and arranged to be applied to a wheel of the car; and means for applying force to said brake lever to apply said brake to the shoe, substantially as described.

11. The combination with the side frames of a car truck, of a truck bolster mounted in said side frames; springs in said side frames under the opposite ends of said bolster; a bearing plate removably seated in each side frame under the corresponding springs; a vertically movable bearing plate on top of each of said first mentioned bearing plates; a plurality of rocker shafts extending between said side frames and having their opposite ends located between the bearing plates in each side frame; rocker arms on each rocker shaft arranged to separate the super-posed bearing plates and shaped to exert a constant leverage thereon; an operative connection between said rocker shafts compelling simultaneous operation thereof; a lifting lever secured at its lower end to one of said rocker shafts; a brake lever constantly fulcrumed on the upper end of said lifting lever; a brake shoe carried by said brake lever and arranged to be applied to a wheel of the car; and means for applying force to said brake lever to apply said brake to the shoe, substantially as described.

12. The combination with the side frames of a car truck, of a truck bolster mounted in said side frames; springs in said side frames under the opposite ends of said bolster; a bearing plate removably seated in each side frame under the corresponding springs; a vertically movable bearing plate on top of each of said first mentioned bearing plates; a plurality of rocker shafts extending between said side frames and having their opposite ends located between the bearing plates in each side frame; rocker arms on each rocker shaft arranged to separate the superposed bearing plates; an operative connection between said rocker shafts compelling simultaneous operation thereof; a lifting lever secured at its lower end to one of said rocker shafts; a fulcrum for the brake lever of the truck mounted on the upper end of said lifting lever; a second brake lever oppositely positioned with reference to said first mentioned brake lever; and an operative connection between said levers, substantially as described.

13. The combination with the side frames of a car truck, of a truck bolster mounted in said side frames; springs in said side frames under the opposite ends of said bolster; a bearing plate removably seated in each side frame under the corresponding springs; a vertically movable bearing plate on top of each of said first mentioned bearing plates; a plurality of rocker shafts extending between said side frames and having their opposite ends located between the bearing plates in each side frame; rocker arms on each rocker shaft arranged to separate the superposed bearing plates and shaped to exert a constant leverage thereon; an operative connection between said rocker shafts compelling simultaneous operation thereof; a lifting lever secured at its lower end to one of said rocker shafts; and a fulcrum for the brake lever of the truck mounted on the upper end of said lifting lever; a second brake lever oppositely positioned with reference to said first mentioned brake lever; and an operative connection between said levers, substantially as described.

14. The combination with the side frames of a car truck, of a truck bolster mounted in said side frames; springs in said side frames under the opposite ends of said bolster; a bearing plate removably seated in each side frame under the corresponding springs; a vertically movable bearing plate on top of each of said first mentioned bearing plates; a plurality of rocker shafts extending between said side frames and having their opposite ends located between the bearing plates in each side frame; rocker arms on each rocker shaft arranged to separate the super-posed bearing plates; an operative connection between said rocker shafts compelling simultaneous operation thereof; a lifting lever secured at its lower end to one of said rocker shafts; a brake lever constantly fulcrumed on the upper end of said lifting lever; a brake shoe carried by said brake lever and arranged to be applied to a wheel of the car; a second brake lever oppositely positioned with reference to said first mentioned brake lever; a brake shoe on said second brake lever; an operative connection between said brake lever; and means for applying force to said second brake lever to apply the brake thereon, substantially as described.

15. The combination with the side frames of a car truck, of a truck bolster mounted in said side frames; springs in said side frames under the opposite ends of said bolster; a bearing plate removably seated in each side frame under the corresponding springs; a vertically movable bearing plate on top of each of said first mentioned bearing plates; a plurality of rocker shafts extending between said side frames and having their opposite ends located between the bearing plates in each side frame; rocker arms on each rocker shaft arranged to separate the super-posed bearing plates and shaped to exert a constant leverage thereon; an operative connection between said rocker shafts compelling simultaneous operation thereof; a lifting lever secured at its lower end to one of said rocker shafts; a brake lever constantly fulcrumed on the upper end of said lifting lever; a brake shoe carried by said brake lever and arranged to be applied to a wheel of the car; a second brake lever oppositely positioned with reference to said first mentioned brake lever; a brake shoe on said second brake lever; an operative connection between said brake lever; and means for applying force to said second brake lever to apply the brake thereon, substantially as described.

16. The combination with the side frames of a car truck, of a truck bolster mounted in said side frame; springs in said side frames under the opposite ends of said bolster; a bearing plate removably seated in each side frame under the corresponding springs, each of said bearing plates having flanges loosely engaging the outer and inner sides of the corresponding side frames; a vertically movable bearing plate on top of each of said first mentioned bearing plates, having depending flanges fitting thereover; a plurality of rocker shafts extending between said side frames, having opposite ends located between the bearing plates in each side frame, the depending flanges of the superposed plates being notched to accommodate said rocker shafts; rocker arms on each rocker shaft arranged to separate the superposed bearing plates and shaped to exert a constant leverage thereon, said bearing plates being recessed for the reception of said rocker arms and normally resting against each other; a lifting lever secured at its lower end to one of said rocker shafts; a link connected with said lifting lever; rocker arms on the other of said rocker shafts operatively connected with said link; a brake lever constantly fulcrumed on the upper end of said lifting lever; a brake beam carried by said brake lever; a second brake lever oppositely positioned with reference to said first mentioned brake lever; a brake beam carried by said second brake lever; an operative connection between said brake levers; and means for applying force to said second brake levers to apply the brakes of the truck, substantially as described.

In testimony whereof I have signed my name to this specification in the presence of two subscribing witnesses.

ELMYR A. LAUGHLIN.

Witnesses:
 JOSHUA R. H. POTTS,
 B. G. RICHARDS.